(12) United States Patent
Sparks

(10) Patent No.: US 10,408,283 B2
(45) Date of Patent: Sep. 10, 2019

(54) CLUTCH RELEASE SYSTEM

(71) Applicant: Deere & Company, Moline, IL (US)

(72) Inventor: Richard M. Sparks, Bartlesville, OK (US)

(73) Assignee: DEERE & COMPANY, Moline, IL (US)

(*) Notice: Subject to any disclaimer, the term of this patent is extended or adjusted under 35 U.S.C. 154(b) by 777 days.

(21) Appl. No.: 14/868,515

(22) Filed: Sep. 29, 2015

(65) Prior Publication Data
US 2017/0089406 A1    Mar. 30, 2017

(51) Int. Cl.
F16D 25/0638    (2006.01)
B60K 7/00    (2006.01)
B60K 17/02    (2006.01)
B60K 17/04    (2006.01)
F16D 43/284    (2006.01)
B60K 23/08    (2006.01)
F16D 13/52    (2006.01)
F16H 1/06    (2006.01)
(Continued)

(52) U.S. Cl.
CPC ............ F16D 43/284 (2013.01); A01B 76/00 (2013.01); A01C 7/20 (2013.01); A01C 15/005 (2013.01); B60K 7/0007 (2013.01); B60K 17/02 (2013.01); B60K 17/043 (2013.01); B60K 23/08 (2013.01); F16D 25/0638 (2013.01); B60K 2007/0061 (2013.01); B60Y 2200/147 (2013.01); B60Y 2400/424 (2013.01); F16D 13/52 (2013.01); F16H 1/06 (2013.01)

(58) Field of Classification Search
CPC .......... B60K 7/0007; B60K 2007/0061; B60K 17/02; B60K 17/04; B60K 17/043; B60K 23/08; B60K 2023/0866; F16D 43/04–43/18; F16D 43/284; F16D 25/0638
USPC ...................................................... 192/104 F
See application file for complete search history.

(56) References Cited

U.S. PATENT DOCUMENTS 2,210,416 A    8/1940  Kiep et al.
3,250,358 A    5/1966  Aschauer
(Continued)

OTHER PUBLICATIONS

DE1020162176013 Search Report from the German Intellectual Property Office dated Mar. 23, 2018 (13 pages, which includes a Statement of Relevance).

Primary Examiner — Richard M Lorence
(74) Attorney, Agent, or Firm — Michael Best & Friedrich LLP

(57) ABSTRACT

A clutch assembly configured to selectively engage and disengage a power source and a transmission includes an input member configured for coupling to the power source and an output member configured for coupling to the transmission. A clutch pack is engaged with the input member for co-rotation about an axis. A housing is engaged with the output member and with the clutch pack and is further configured to move in a first direction along the axis and in a second direction opposite to the first direction. The clutch assembly includes a cover and a ring member positioned along the axis from the cover such that the cover and the ring member define a movable chamber therebetween configured to receive a hydraulic fluid. The clutch pack is operable to decouple the input member from the output member in response to a pressure of the hydraulic fluid within the chamber.

20 Claims, 12 Drawing Sheets

(51) Int. Cl.
    *A01C 7/20*      (2006.01)
    *A01B 76/00*     (2006.01)
    *A01C 15/00*     (2006.01)

(56) References Cited

U.S. PATENT DOCUMENTS

| | | | |
|---|---|---|---|
| 3,485,328 A | | 12/1969 | Bilton |
| 3,667,583 A | | 6/1972 | Richards |
| 4,471,861 A | * | 9/1984 | McIntosh ................ F01P 7/082<br>192/104 F |
| 6,874,606 B1 | | 4/2005 | Heidenreich |
| 2007/0251743 A1 | * | 11/2007 | Adams, III .......... B60K 7/0007<br>180/65.6 |
| 2009/0105042 A1 | * | 4/2009 | Tanba ...................... B60K 6/48<br>477/77 |

\* cited by examiner

US 10,408,283 B2

CLUTCH RELEASE SYSTEM

BACKGROUND

The present disclosure relates to a clutch. In particular, the present disclosure relates to a system for disengaging a clutch with fluid pressure.

SUMMARY

A clutch assembly configured to selectively engage and disengage a power source and a transmission includes an input member configured for coupling to the power source and an output member configured for coupling to the transmission. The input member and the output member are rotatable about an axis. A clutch pack is engaged with the input member for co-rotation about the axis. A housing is engaged with the output member and with the clutch pack for co-rotation about the axis and is further configured to move in a first direction along the axis and in a second direction opposite to the first direction. The clutch assembly includes a cover and a ring member positioned along the axis from the cover such that the cover and the ring member define a movable chamber therebetween configured to receive a hydraulic fluid. The clutch pack is operable to decouple the input member from the output member in response to a pressure of the hydraulic fluid within the chamber.

A drive system includes an electric motor and a transmission member coupled to a wheel hub assembly. A hydraulically actuated clutch assembly is operable to disengage the electric motor from the transmission member in response to a rotational velocity of the wheel hub assembly above a predetermined amount.

A method of selectively engaging and disengaging a first clutch member from a second clutch member within a clutch assembly, in which a portion of the clutch assembly defining a chamber is configured to receive a hydraulic fluid, includes introducing hydraulic fluid into the chamber and rotating the clutch assembly about an axis at a first rotational velocity, thereby increasing the pressure of the hydraulic fluid within the chamber. The method also includes moving a component of the clutch assembly along the axis in a first direction in response to increasing the pressure of the hydraulic fluid within the chamber. The method additionally includes separating the first clutch member from the second clutch member in response to the moving.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
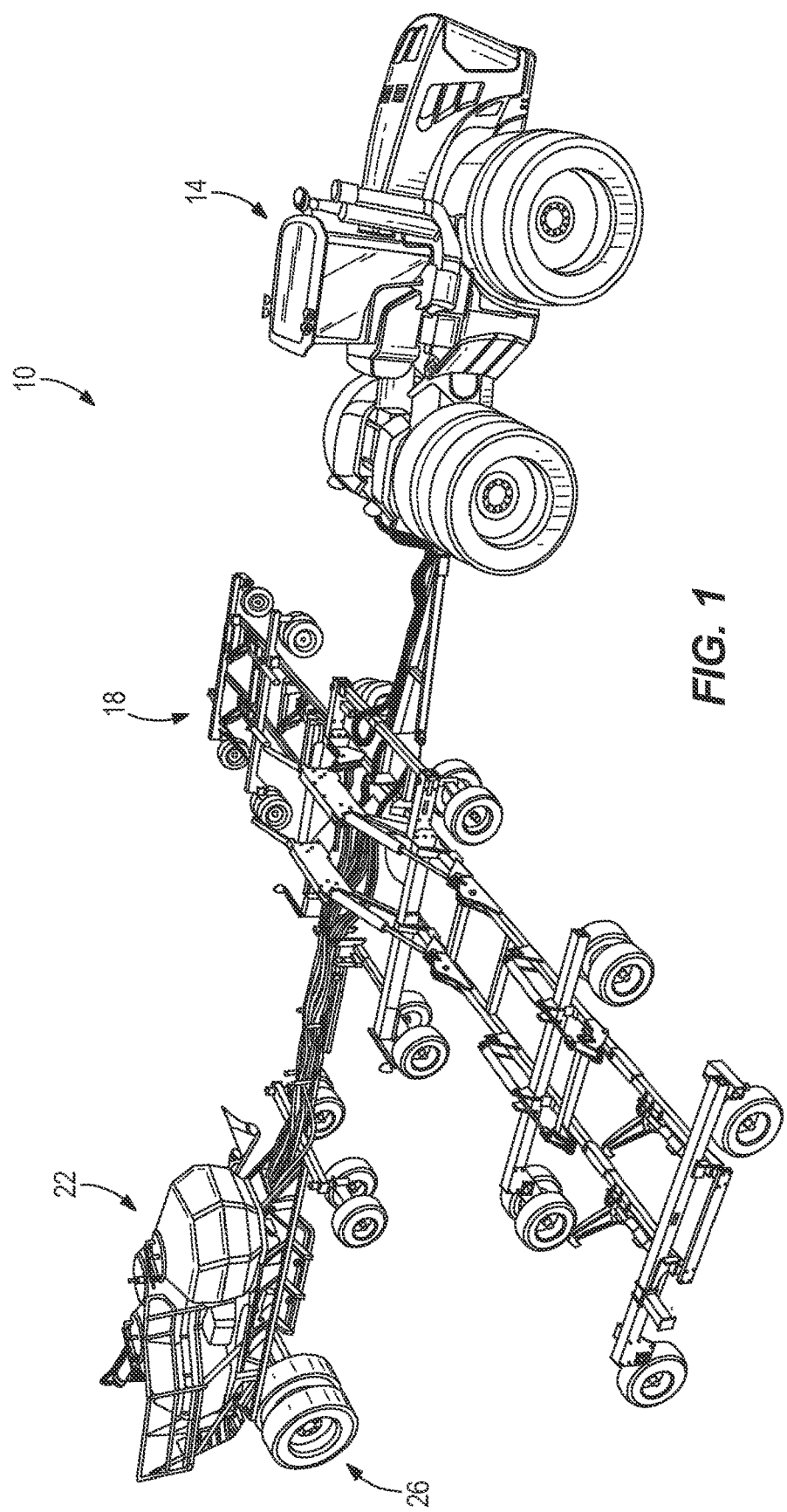
FIG. 1 is a perspective view of certain agricultural equipment.

FIG. 1 illustrates certain agricultural equipment 10 including a tractor 14, an intermediate unit 18, and a commodity cart 22. The tractor 14 is coupled to both the intermediate unit 18 and the commodity cart 22 to move the intermediate unit 18 and the commodity cart 22 during an agricultural process (e.g., through an agricultural field). The tractor 14 also supplies operational power in the form of hydraulic, electrical, and/or mechanical power to the intermediate unit 18 and/or the commodity cart 22.

The illustrated intermediate unit 18 is configured as a tillage unit operable to create a trough, dispense seeds within the trough, and close the trough for proper growing conditions for the seeds. In other embodiments, the intermediate unit 18 may be replaced with other agricultural machinery, or may be omitted. The commodity cart 22 supplies resources such as fertilizer, seed, etc., for the particular agricultural process and is configured to be at least partially self-propelled through a drive system 26 using power transferred from the tractor 14.

Figure 2:
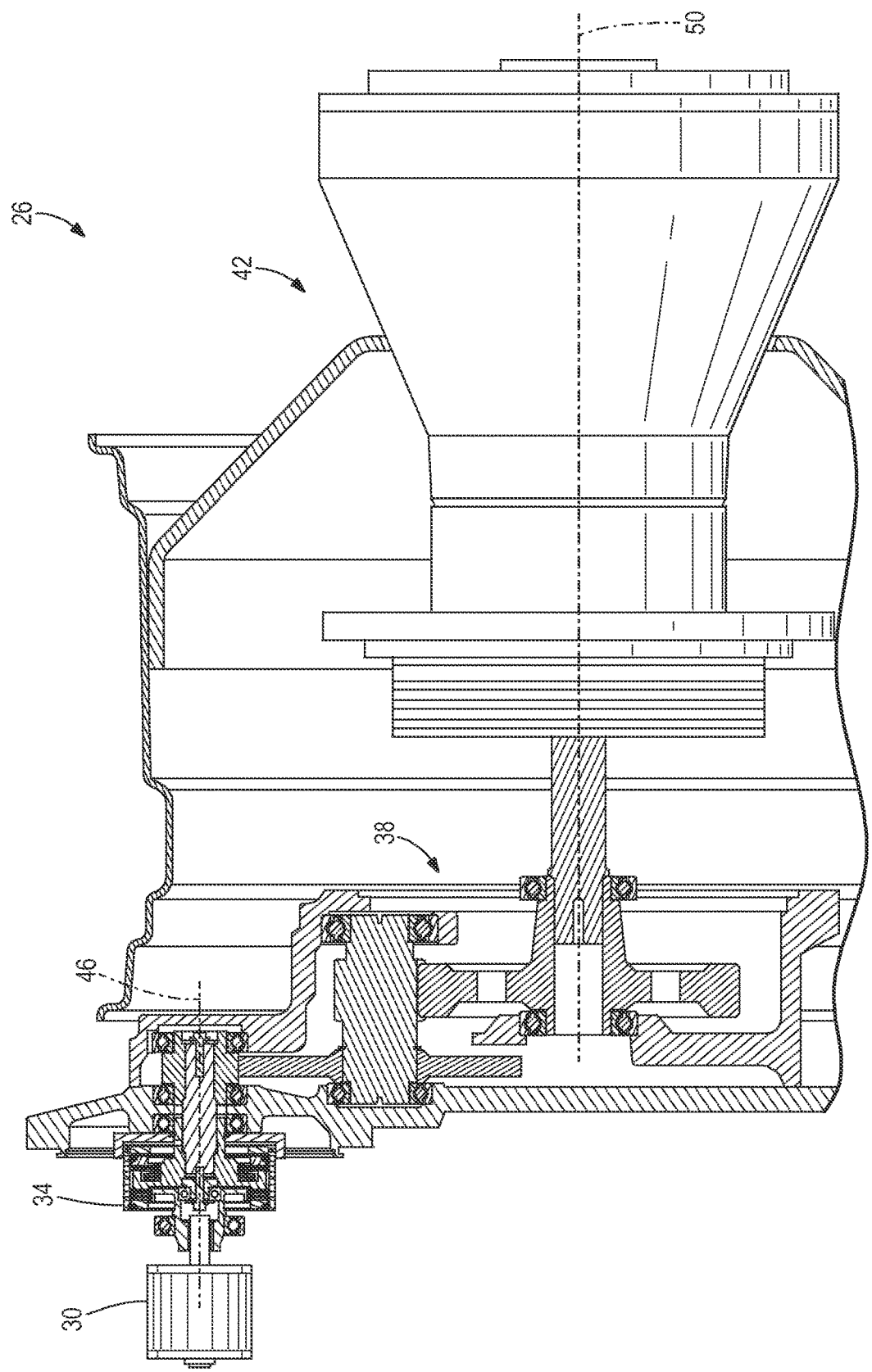
FIG. 2 is a cross-sectional view of a drive system according to an embodiment of the disclosure for use with the equipment of FIG. 1.

FIG. 2 illustrates the drive system 26, which comprises a power source 30 (e.g., an electric motor), a clutch assembly 34, a transmission 38, and a wheel hub assembly 42. Each drive system 26 is configured to power a wheel of the commodity cart 22 to overcome the rolling resistance of the wheel across a surface and therefore assist in overall propulsion of the equipment 10. In other words, the drive system 26 is operable to provide assistance to the tractor 14 to move the commodity cart 22.

The tractor 14 includes a prime mover (not shown) coupled to a generator (not shown) configured to provide power to the electric motor 30. In other applications, an alternative source of power can be supplied to the electric motor 30. The electric motor 30 is positioned to transmit rotational power (e.g., torque) to the clutch assembly 34, both of which are oriented about a rotation axis 46. The clutch assembly 34, which will be further detailed below, is also coupled to the transmission 38 and selectively operable to transmit torque thereto. In the illustrated embodiment, the transmission 38 is a gearing system cooperative with the clutch assembly 34 to increase the torque supplied to the wheel hub assembly 42 from the electric motor 30. The wheel hub assembly 42 rotates about an axis 50 offset from the axis 46 of the clutch assembly 34, but in other embodiments the clutch assembly 34 may be orientated relative to the wheel hub assembly 42 such that the axes 46, 50 are collinear.

Referring to FIGS. 3-6, the clutch assembly 34 includes an input member 54 having a hollow center defining an internal input gear spline 58 for engagement with a corresponding shaft (not shown) of the electric motor 30. The input member 54 presents external teeth 62 on an outer periphery. A bearing 66 secures the input member 54 for rotation about the axis 46.

An output member 70 has a hollow portion or recess 76 at least partially defining an internal output gear spline 74 for engagement with a portion of the transmission 38 and further presents external teeth 78. An internal bearing assembly 82 includes a plug 84 coupled to the output member 70 to permit the output member 70 to rotate about the axis 46. A cavity 86 formed in the output member 70 radially extends 360 degrees about an inside surface concentrically with the axis 46. In other embodiments, the cavity 86 may be constructed into a plurality of discrete cavities radially spaced around the axis 46. In addition, the output member 70 includes a snap ring groove 92 and a fluid aperture 90 positioned adjacent the output spline 74 in communication with the hollow center 76.

A clutch pack 94 selectively couples the input member 54 to the output member 70. The clutch pack 94 includes alternating friction disks 98 and reaction plates 102. In the illustrated embodiment, the clutch assembly 34 includes three friction disks 98 and two reaction plates 102. The clutch pack 94 is arranged such that each of the reaction plates 102 is located between two friction disks 98. In other embodiments, the clutch pack 94 may include more or less than three friction disks 98 and two reaction plates 102 dependent upon application requirements. For example, within applications producing higher torque loads through the clutch assembly 34, additional friction disks 98 and reaction plates 102 are required to effectively transfer the high torque loads from the input member 54 to the output member 70. The friction disks 98 include frictionally enhanced surfaces 108 to increase the coefficient of friction thereon and radially inwardly facing teeth 106. Conversely, the reaction plates 102 include radially outwardly facing teeth 110.

Figure 3:
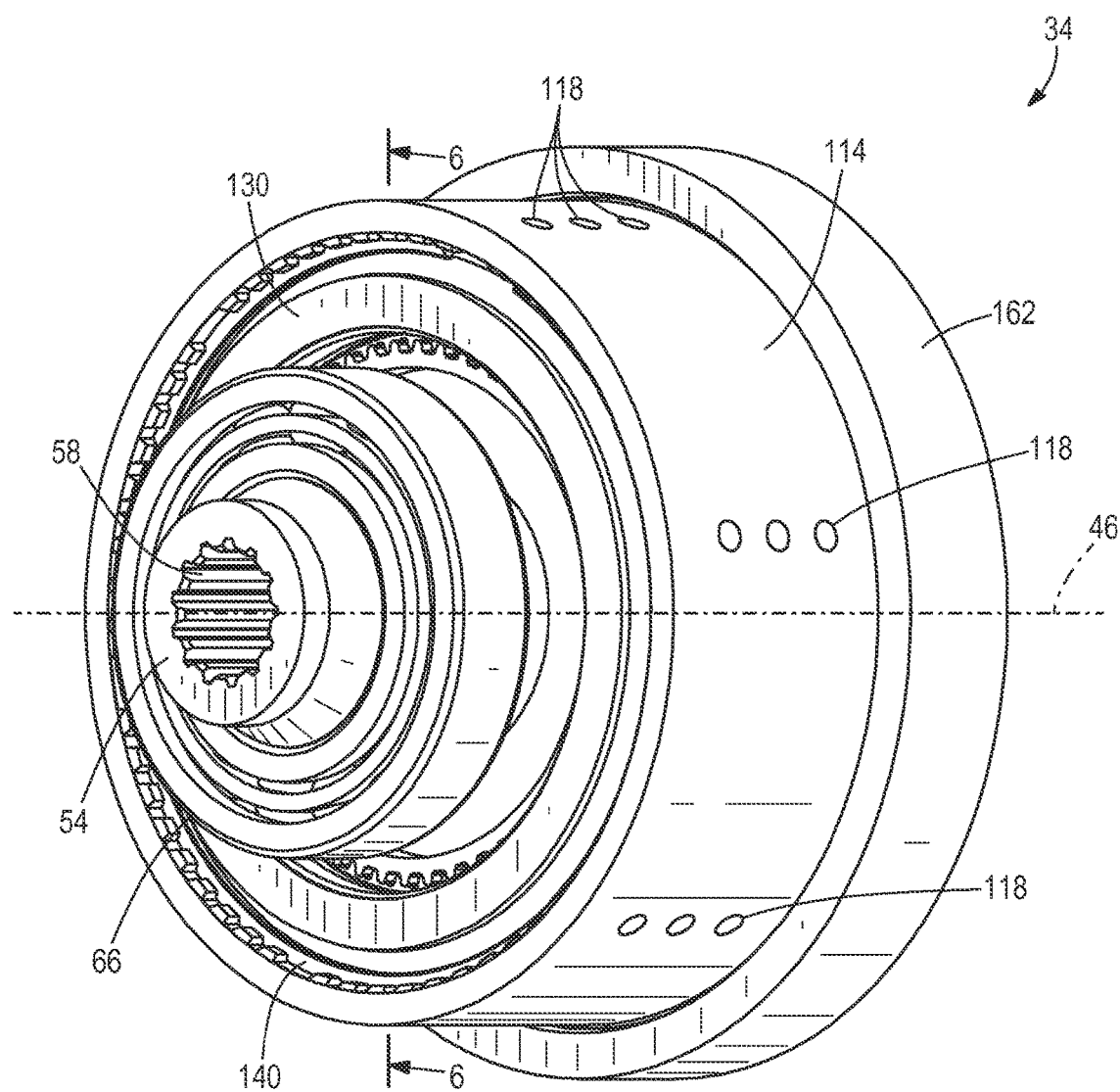
FIG. 3 is a perspective view of a clutch of the drive system of FIG. 2.
Figure 4:
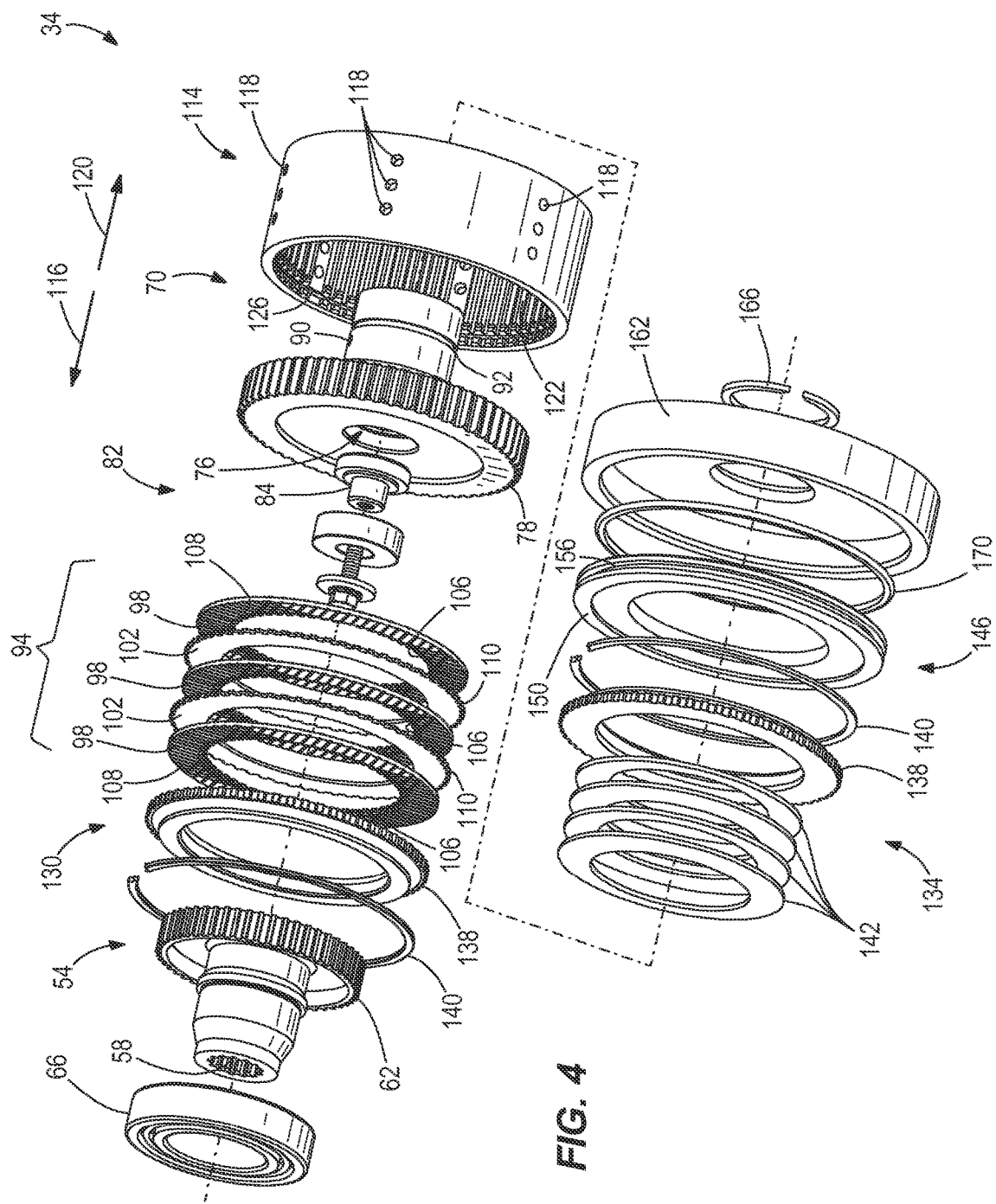
FIG. 4 is a front exploded perspective view of the clutch of FIG. 3.
Figure 5:
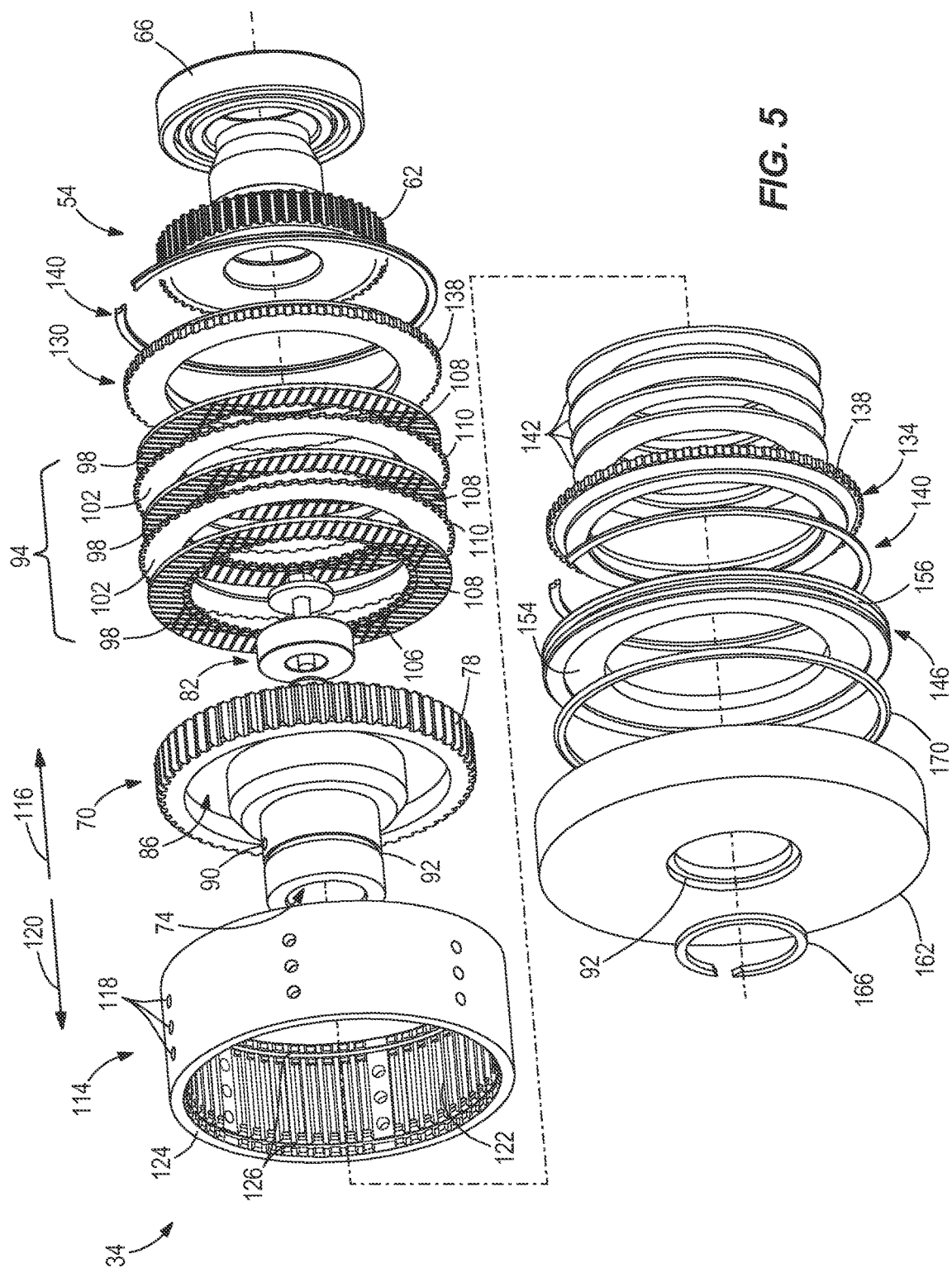
FIG. 5 is a rear exploded perspective view of the clutch of FIG. 3.

With reference also to FIG. 3, the clutch assembly 34 includes a housing 114 surrounding the clutch pack 94 and portions of the input member 54 and the output member 70. The housing 114 is generally defined as a hollow cylindrical member and is configured to translate along the axis 46 in a forward or first direction 116 and a rearward or second direction 120. The housing 114 includes an end with an abutting surface 124, the purpose of which will be further detailed. Vent apertures 118 radially spaced on the housing 114 provide communication between the exterior and the interior of the housing 114. In the illustrated embodiment, the vent apertures 118 are spaced in six groupings of three apertures axially aligned about the periphery of the housing 114 (e.g., each grouping is radially spaced 60 degrees apart). In other embodiments, the vent apertures 118 may be differently constructed to include more or fewer than six groupings and include more or fewer than three apertures within each group. The housing 114 includes internal teeth 122 located on an interior surface. Locations on the interior surface corresponding to the vent apertures 118 omit the teeth 122; however, in other embodiments, teeth 122 may be continuous around the interior surface. In addition, opposing grooves 126 generally located adjacent the edges of the housing 114 extend 360 degrees therein (FIG. 5).

The clutch assembly 34 also includes a front end ring 130 and a rear end ring 134 on each side, respectively, of the clutch pack 94. The front end ring 130 generally surrounds the input member 54 and the rear end ring 134 generally surrounds the output member 70. Each end ring 130, 134 is stepped and includes a portion having teeth 138 that radially face away from the axis 46. Each end ring 130, 134 is axially fixed relative to the housing 114 via snap rings 140 positionable within the grooves 126.

The clutch assembly 34 includes biasing members 142 located between the output member 70 and the rear end ring 134 and received within the cavity 86. In the illustrated embodiment, the biasing members 142 comprise four disc springs that bias the rear end ring 134 from the output member 70. In other embodiments, the biasing members 142 may be differently constructed (e.g., coil springs) to bias the output member 70 from the rear end ring 134.

Figure 6:
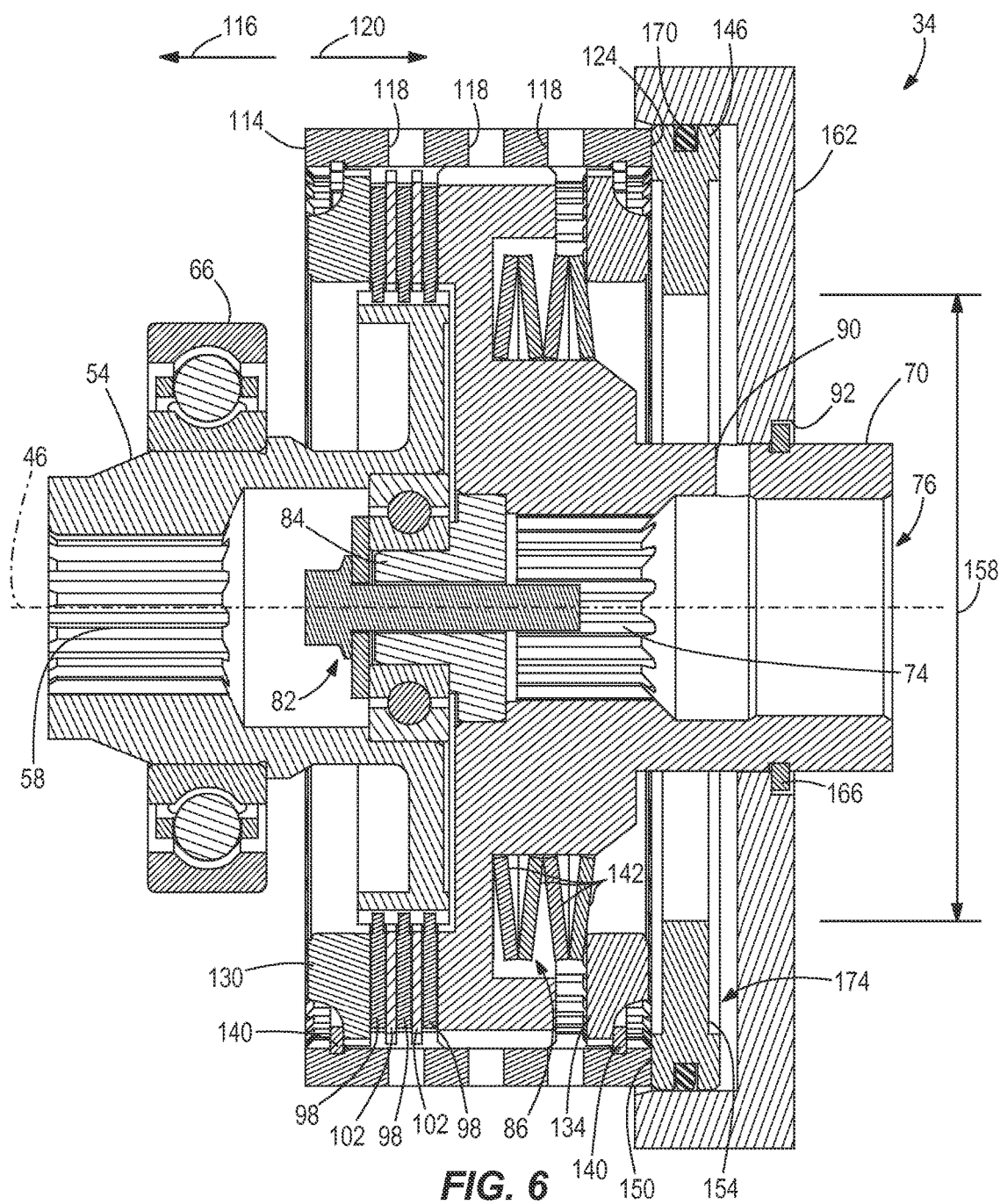
FIG. 6 is a cross-sectional view of the clutch taken along line 6-6 of FIG. 3, with the clutch in an engaged position.

A ring member 146 adjacent the housing 114 and the rear end ring 134 includes a front surface 150 facing the abutting surface 124 of the housing 114 and a rear surface 154, with a cross-section of the ring member 146 generally defined by a T-shape (FIG. 6). A circumferential groove 156 is located between the front and the rear surfaces 150, 154 at a periphery of the ring member 146. The ring member 146 further defines an inner diameter 158, which in the illustrated embodiment is about 4.33 inches. In other embodiments, the inner diameter 158 may vary from about 1.5 inches to about 6 inches. A seal ring 170 is seated within the groove 156.

An outer diameter of the ring member 146 is sized to be received within an inner diameter of a cover 162, which in turn is also sized to receive an edge portion of the housing 114. The cover 162 is coupled to the output member 70 via a snap ring 166 within the groove 92 to inhibit relative movement between the cover 162 and the output member 70 along the axis 46. In the illustrated embodiment, the cover 162 is fixed relative to the output member 70 for co-rotation therein. As a result, a clearance fit (e.g., frictional fit) may be constructed between the cover 162 and the output member 70. In other embodiments, angular acceleration observed by the output member 70 may be low enough such that the cover 162 may not need to be fixed to the output member 70. Rather, there exists a slight differential of angular velocity between the cover 162 and the output member 70.

During assembly of the clutch assembly 34, the input member 54 is rotatably fixed to the bearing 66 and the output member 70 is rotatably fixed to the bearing assembly 82 via the plug 84. The housing 114 is assembled over the output member 70 such that teeth 78, 122 are engageably coupled. The clutch pack 94 is assembled to couple the input member 54 to the housing 114 through engagement of the teeth 110 of the reaction plates 102 with the teeth 122 and through engagement of the teeth 106 of the friction disks 98 with the teeth 62.

Each of the front end rings 130, 134 is positioned such that the teeth 138 mate with the teeth 122. The snap rings 140 abut each of the end rings 130, 134 and are located within the grooves 126 to prevent the front end ring 130 from moving in the forward direction 116 and the rear end ring 134 from moving in the rearward direction 120 relative to the housing 114.

The biasing members 142 are positioned between and in direct contact with the output member 70 and the rear end ring 134. Upon assembly, the biasing members 142 bias the rear end ring 134 in the rearward direction 120 to force the front end ring 130 via the housing 114 against the clutch pack 94.

The ring member 146 is assembled between the cover 162 and the housing 114 such that the front surface 150 engages the abutting surface 124. The ring member 146 defines a fluid-tight seal with the cover 162. The fluid-tight seal can be provided via the ring seal 170 or by the direct engagement between the ring member 146 and the cover 162. The cover 162 is positioned generally rearward of the fluid aperture 90 on the output member 70 such that the fluid aperture 90 is in communication with a gap or chamber 174 formed between the cover 162 and the ring member 146.

FIG. 6 illustrates the clutch assembly 34 in a non-operational and operational engaged position. In other words, prior to operation of the clutch assembly 34 (i.e., when the clutch assembly 34 is rotationally stationary), the biasing members 142 force the rear end rings 134 in the rearward direction 120, which, due to the snap rings 140, biases the housing 114 and front end ring 130 in the direction 120 to compress the clutch pack 94 against the output member 70. This additionally forces the abutting surface 124 against the front surface 150, which in turn forces the ring member 146 in the rearward direction 120. In operation, rotational movement (i.e., torque) supplied to the input member 54 via the electric motor 30 is transferred through the clutch assembly 34 to rotate the transmission 38 via the output member 70. Specifically, the friction disks 98 co-rotate with the input member 54 via engagement between teeth 62, 106. The biasing members 142 continue to force the rear end ring 134 in the rearward direction 120, which as described forces the clutch pack 94 against the output member 70. As such, the reaction plates 102 co-rotate with the friction disks 98 and rotate the housing 114 via engagement between teeth 110, 122. Because the output member 70 co-rotates with the housing 114 via engagement between teeth 78, 122, torque is transferred from the housing 114 to the output member 70.

As the clutch assembly 34 rotates, fluid (e.g., oil) supplied to the interior of the output member 70 flows through the aperture 90 and into the chamber 174. The fluid collects within the chamber 174 and, as the rotational velocity of the clutch assembly 34 increases, is forced radially outward, increasing the fluid pressure within the chamber. In particular, the centripetal forces acting on a mass of fluid within the chamber 174 are a function of the rotational speed of the clutch assembly 34. These forces necessarily increase the pressure of the fluid, which acts against the surface area of the rear surface 154, itself dependent on the inner diameter 158.

This force on the rear surface 154 is transferred through the ring member 146 to the abutting surface 124 in the forward direction 116 against the biasing force of the biasing member 142 in the rearward direction 120.

Therefore, the engaged position of the clutch assembly 34 is observed when the force produced by the biasing members 142 that acts in the rearward direction 120 is greater than the force produced by the fluid within the chamber 174 that acts in the forward direction 116. In operation, the components of the clutch assembly 34 are sized such that the engaged position occurs when the rotational velocity of the clutch assembly 34 is below about 7,000 revolutions per minute (RPM).

Figure 7:
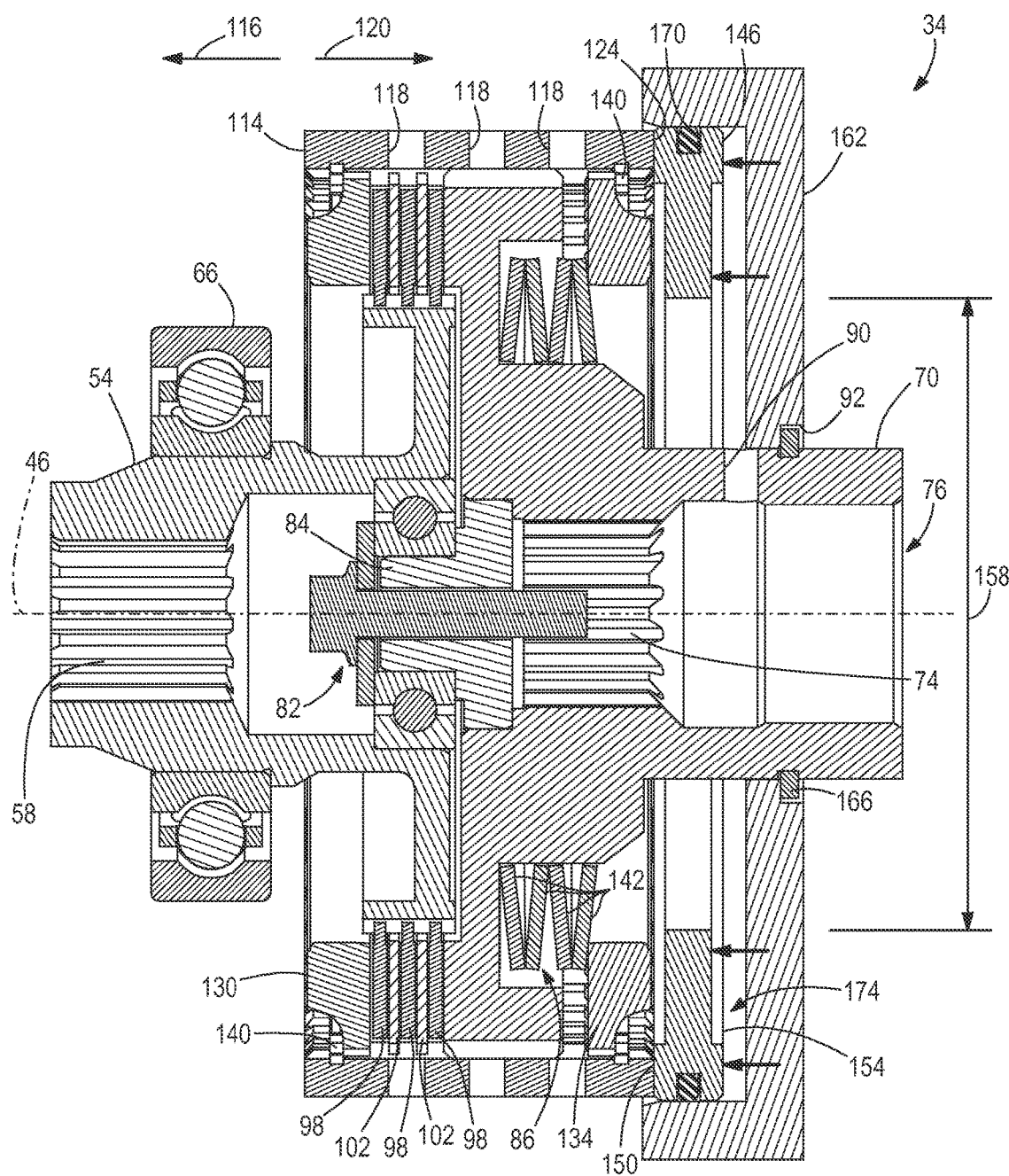
FIG. 7 is a cross-sectional view of the clutch of FIG. 3 in an intermediate position.

Referring to FIG. 7, as the rotational velocity of the clutch assembly 34 increases during operation, the pressure of the fluid within the chamber 174 increases as previously described, until the force on the ring member 146 due to the increased pressure reaches a maximum force that can be resisted by the biasing members 142. The fluid within the chamber 174 can also be supplemented with additional fluid introduced through the aperture 90. At this point, the forces generated by the fluid begin to translate the ring member 146 in the forward direction 116. As such, the chamber 174 increases in volume. Simultaneously, the ring member 146, which is in contact with the abutting surface 124, translates the housing 114. As a result, the plates 98, 102 begin to rotate (i.e., slip) relative to each other resulting in an angular velocity differential between the input member 54 and the output member 70. In the illustrated embodiment, this intermediate position automatically occurs when the angular velocity of the clutch assembly 34 is generally between 7,000 and 9,000 RPM.

In addition, the vent apertures 118 permit the release of any increased oil and/or air pressure within the clutch assembly 34 and accordingly generally keep the oil and/or air pressure within the clutch assembly 34 at ambient conditions. Therefore, as the ring member 146 translates in the forward direction 116, oil and/or air pressure within the clutch assembly 34 does not further impede this motion.

Figure 8:
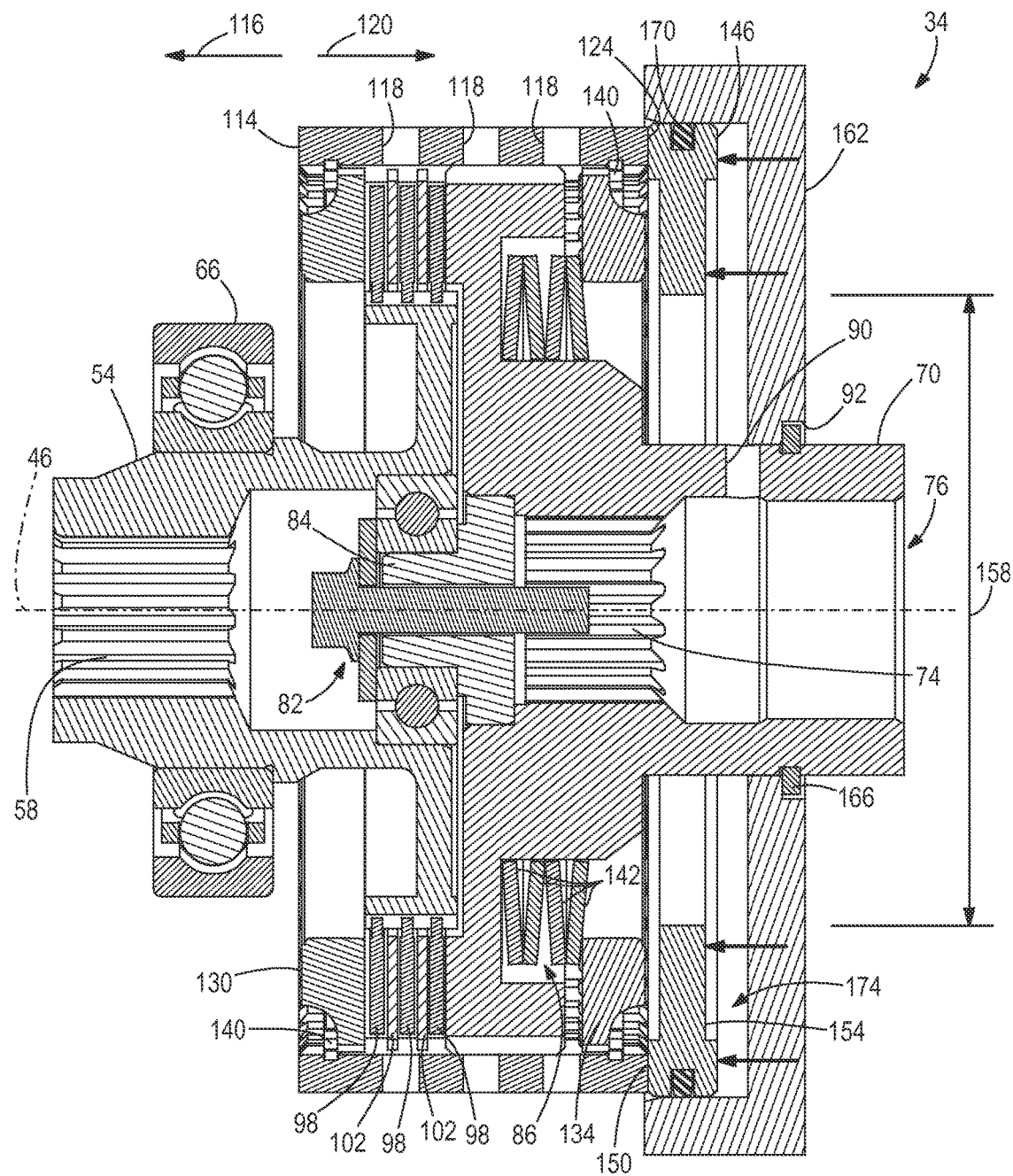
FIG. 8 is a cross-sectional view of the clutch of FIG. 3 in a disengaged position.

FIG. 8 illustrates the clutch assembly 34 in a disengaged position as increasing rotational speed further increases the pressure of the fluid within the chamber 174 and therefore the forces acting on the rear surface 154 above that described with respect to the intermediate position. The ring member 146 additionally translates in the forward direction 116 against the force of the biasing member 142 such that the plates 98, 102 rotate freely relative to each other. In other words, in this mode the reaction plates 102, the housing 114, and the output member 70 are decoupled or disengaged from the input member 54 and the friction disks 98. In the illustrated embodiment, the disengaged position automatically occurs when the angular velocity of the clutch assembly 34 is greater than about 9,000 RPM.

With reference to FIGS. 1 and 2, the clutch assembly 34 automatically disconnects the wheel hub assembly 42 from the electric motor 30 at a predetermined rotational velocity of the hub assembly 42 as described. In other words, the clutch assembly 34 will disengage when the angular velocity of the wheel hub assembly 42 has reached a determined maximum velocity (e.g., a predetermined working speed of the commodity cart 22). At a velocity well below this determined amount, the electric motor 30 assists the tractor 14 in moving the commodity cart 22 via the hub assembly 42. If the wheel hub assembly 42 rotational speed increases above a determined amount (e.g., due to an excessive velocity cart 22 or negligible resistance acting against the wheel hub assembly 42), the electric motor 30 is disconnected from the hub assembly 42, thereby protecting the electric motor 30 from excessive rotational speeds.

In other embodiments, the angular velocity of the clutch assembly 34 that distinguishes between the engaged, the intermediate, and the disengaged positions may be varied and is based on the type of equipment being driven via the wheel hub assembly 42 and/or the type of application pursued, as well as limiting parameters inherent within the power source 30. The different positions of the clutch assembly 34 result from a balance between the pressure developed through fluid rotation and the force thereby applied on the rear surface 154 and the opposing force of the biasing members 142. Therefore, to vary the different positions of the clutch assembly 34 for alternative operations, the surface area of the rear surface 154 (e.g., via altering the inner diameter 158) and/or the biasing force of the biasing members 142 (e.g., via altering the spring type or rate) may be changed.

Figure 9:
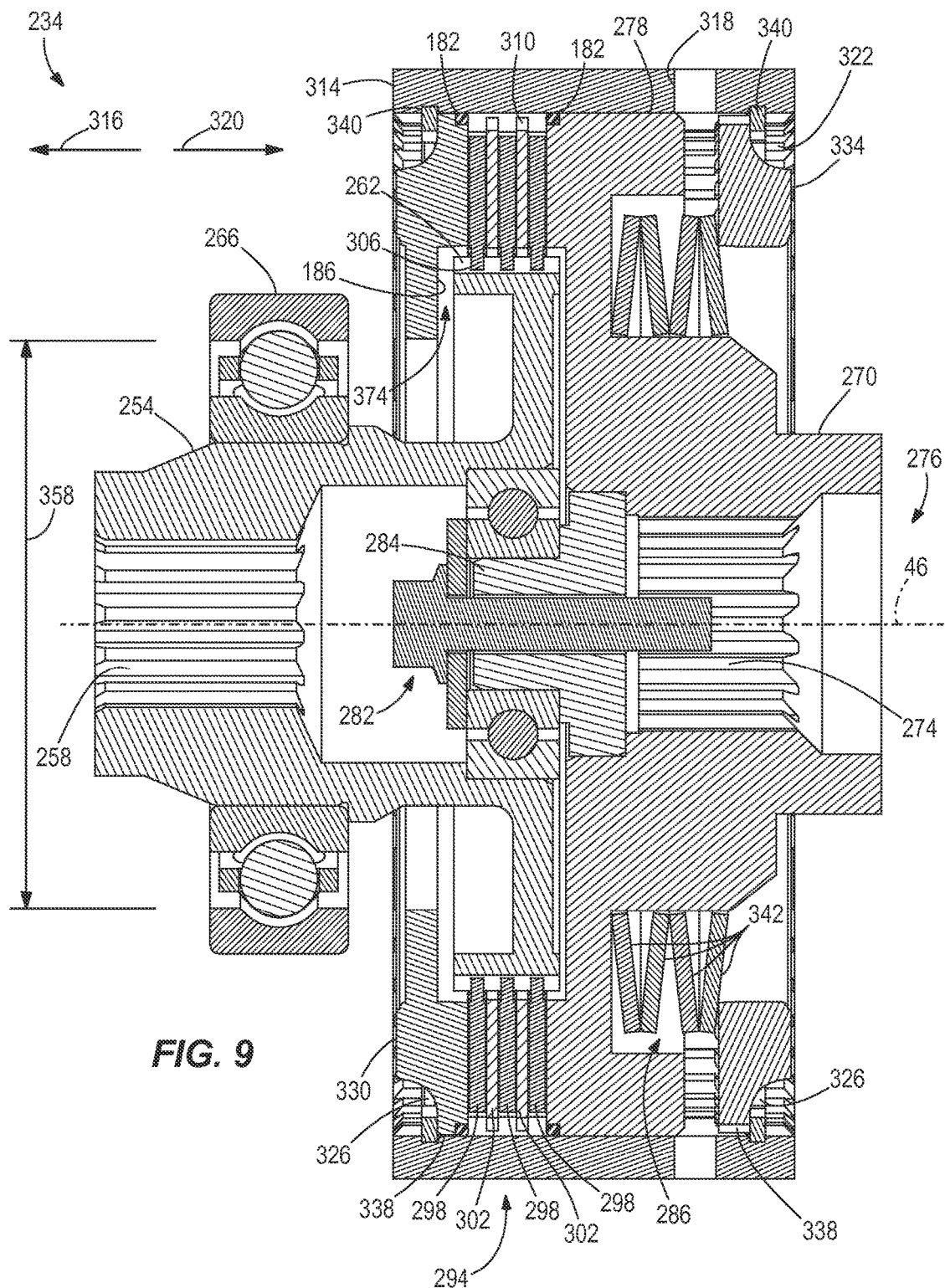
FIG. 9 is a cross-sectional view of another clutch for use with the drive system of FIG. 2.

FIG. 9 illustrates a clutch assembly 234 according to another embodiment of the disclosure. The clutch assembly 234 is similar to the clutch assembly 34 and like components have been given like reference numbers plus 200 such that only differences between the clutches 34 and 234 will be discussed in detail. In addition, components or features described with respect to only one or some of the embodiments described herein are equally applicable to any other embodiments described herein.

The clutch assembly 234 includes an input member 254 having an input spline 258 with teeth 262, and which is secured by a bearing 266. An output member 270 includes a hollow portion 276 that partially defines an output spline 274 with teeth 278, and a cavity 286 that receives biasing members 342. An internal bearing assembly 282 includes a plug 284 coupled to the output member 270 and functions to supply a chamber 374 with fluid (e.g., oil) in the absence of a fluid aperture in the output member. The chamber 374 is defined between a front end ring 330, which has an inner diameter 358, and the output member 270. The clutch assembly 234 also includes a clutch pack 294 having friction disks 298 and reaction plates 302. A housing 314 with internal teeth 322 and at least one vent aperture 318 is likewise moveable in a forward direction 316 and a rearward direction 320. In addition, the friction disks 298 include radially inwardly facing teeth 306, the reaction plates 302 include radially outwardly facing teeth 310, and the housing 314 includes opposing grooves 326.

The front end ring 330 and a rear end ring 334 include teeth 338 to engage the housing 314, and are further coupled to the housing 314 with snap rings 340. The clutch assembly 234 additionally differs from the clutch assembly 34 through the use of gasket rings 182 located generally between the front end ring 330 and the output member 270 surrounding the chamber 374.

In operation, fluid is introduced near the bearing assembly 282 to the chamber 374 as the clutch assembly 234 rotates. In an engaged position as illustrated in FIG. 9, the biasing members 342 bias the housing 314 in the rearward direction 320 to sandwich the front end ring 330 against the clutch pack 294 and the output member 270. With increasing rotation, the pressure of the fluid within the chamber 374 increases such that the force generated on a surface 186 of the front end ring 330 begins to move the front end ring 330 in the forward direction 316 to an intermediate position, and the plates 298, 302 begin to slip. With a further increase in pressure due to increased angular velocity of the clutch assembly 234, the force on the front end ring 330 moves the end ring 330 out of engagement with the clutch pack 294 to a disengaged position, decoupling the input member 254 and the output member 270.

Figure 10:
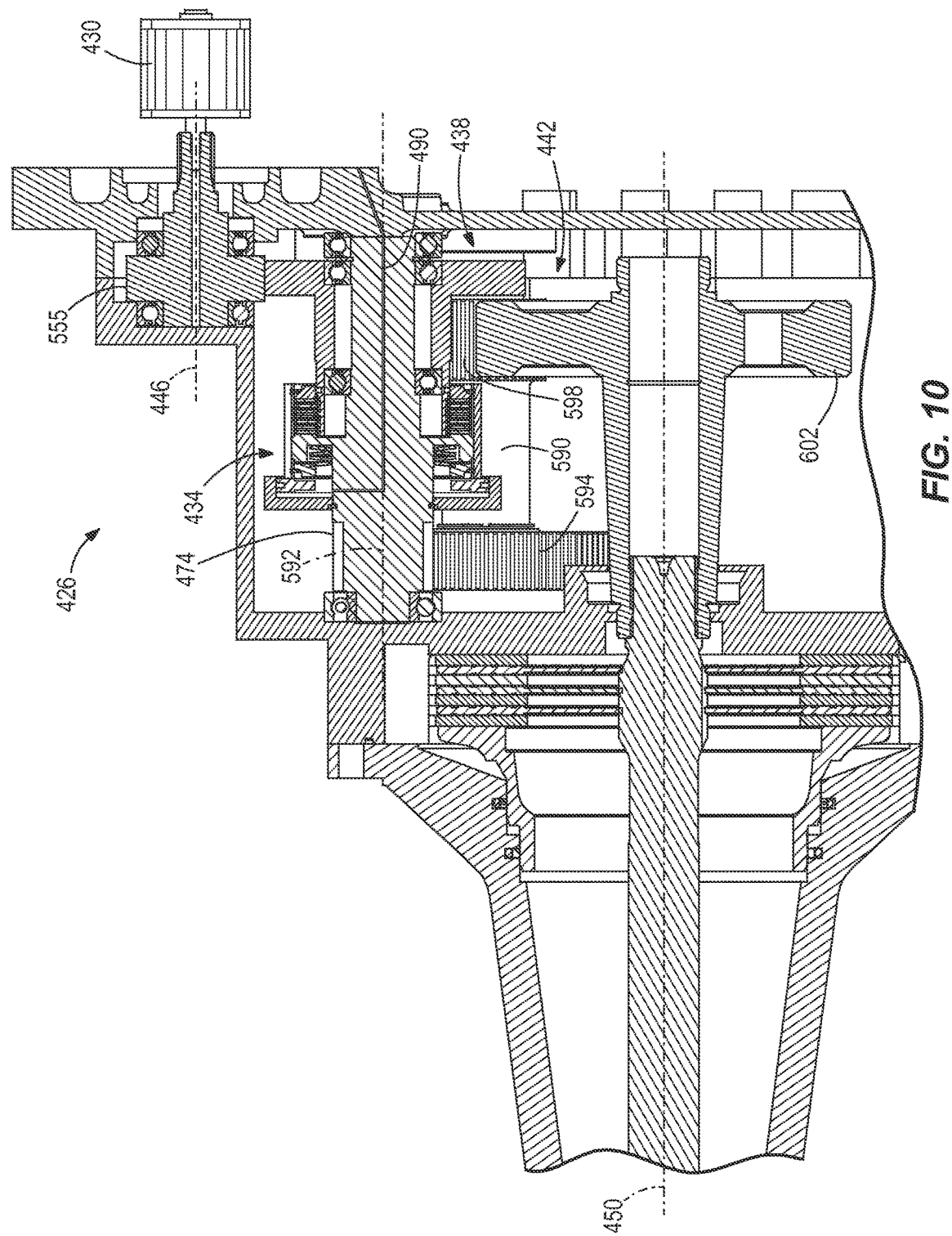
FIG. 10 is a cross-sectional view of a drive system according to another embodiment of the disclosure for use with the equipment of FIG. 1.
Figure 11:
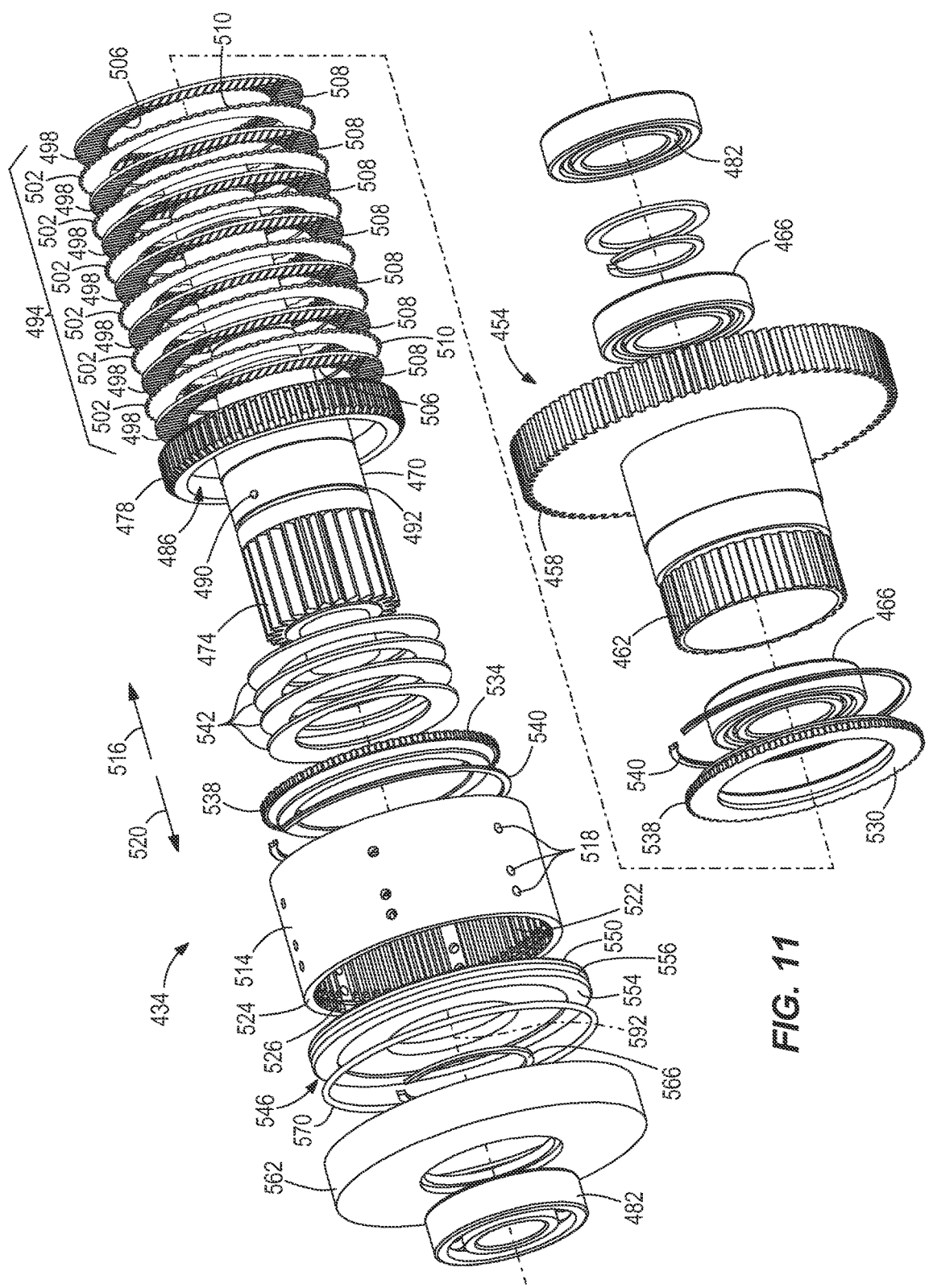
FIG. 11 is an exploded perspective view of a clutch of the drive system of FIG. 10.
Figure 12:
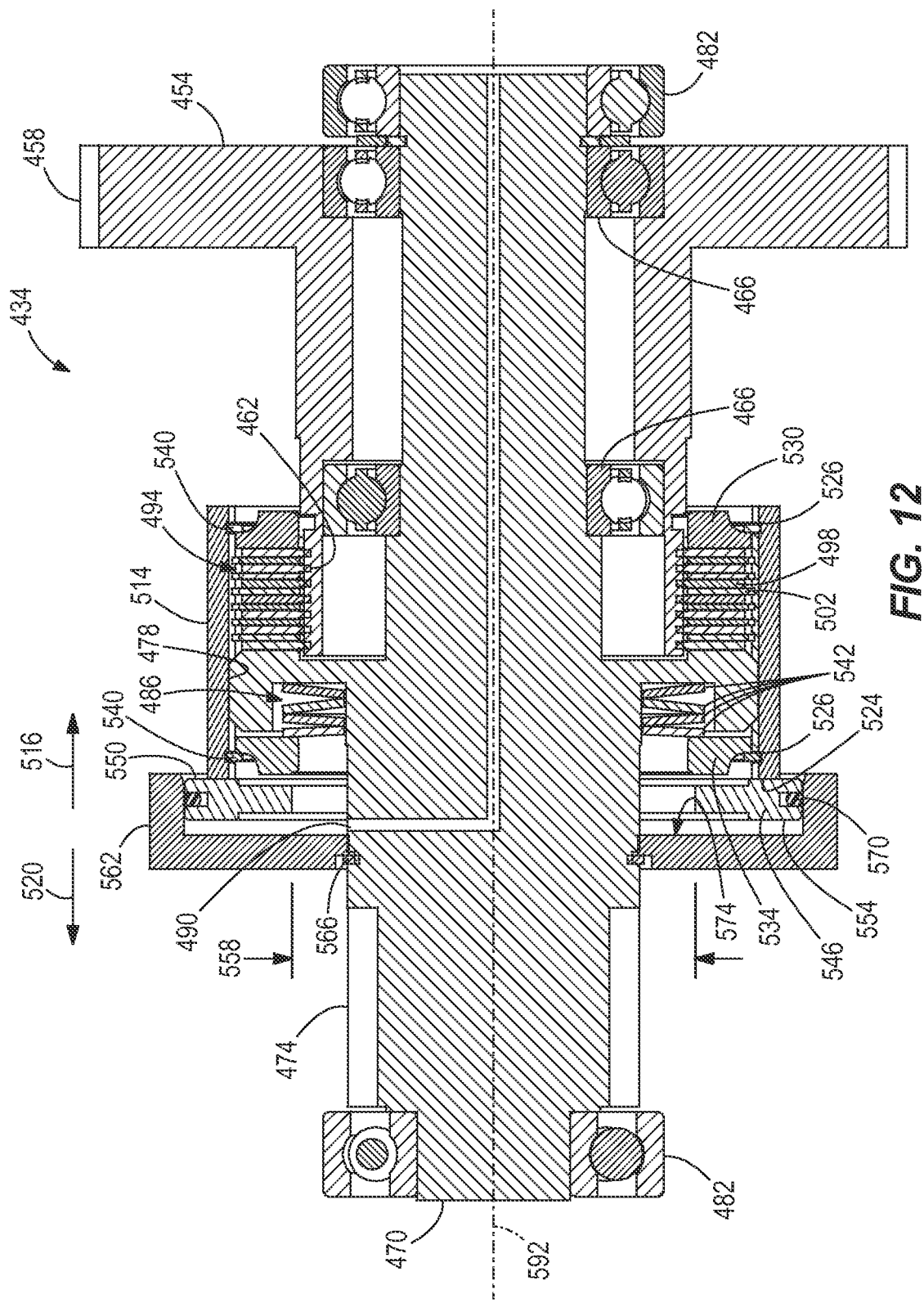
FIG. 12 is a cross-sectional view of the clutch of FIG. 11 in an engaged position.

FIGS. 10-12 illustrate a drive system 426 according to another embodiment of the disclosure. The drive system 426 is similar to the drive system 26; therefore, like components have been given like reference numbers plus 400 and only differences between the drive systems 26 and 426 will be discussed in detail. In addition, components or features described with respect to only one or some of the embodiments described herein are equally applicable to any other embodiments described herein.

FIG. 10 illustrates the drive system 426, which comprises a power source 430 (e.g., an electric motor), a clutch assembly 434, a transmission 438, and a wheel hub assembly 442. The drive system 426 is configured to power a wheel of the commodity cart 22 to overcome the rolling resistance of the wheel across a surface and therefore assist in overall propulsion of the equipment 10.

The electric motor 430 is positioned to transmit rotational power (e.g., torque) to the clutch assembly 434 with the electric motor 430 oriented about a rotation axis 446 and the clutch assembly 434 oriented about a rotational axis 592. The rotational axes 446, 592 are offset from each other in contrast to the electric motor 30 and the clutch assembly 34 of the previous embodiment as illustrated in FIG. 2.

The clutch assembly 434 is also coupled to the transmission 438 and selectively operable to transmit torque thereto. In particular, the transmission 438 includes an idler shaft 590 having an input gear 594 spaced from an output gear 598 with the input gear 594 engaging a portion of the clutch assembly 434 and the output gear 598 engaging an input gear 602 of the wheel hub assembly 442. In the illustrated embodiment, the transmission 438 cooperates with the clutch assembly 434 to increase the torque supplied to the wheel hub assembly 442 from the electric motor 430. The wheel hub assembly 442 rotates about an axis 450 offset from the axes 446, 592.

Referring to FIG. 11, the clutch assembly 434 includes an input member 454 defining a hollow member having an exterior input spur gear 458 for engagement with a gear 555 (FIG. 10) associated with the electric motor 430. The input member 454 presents external teeth 462 on an outer periphery away from the spur gear 458. Bearings 466 secure the input member 454 for rotation about the axis 592.

An output member 470 includes an exterior output spur gear 474 engaging the input gear 594 of the transmission 438. Located away from the output spur gear 474, the output member 470 presents external teeth 478 on an outer periphery. Bearings 482 permit the output member 470 to rotate about the axis 592. In particular, a portion (e.g., an outer ring) of the bearings 482 is fixed to a housing of the drive system 426. A cavity 486 formed in the output member 470 circumferentially extends 360 degrees about an inside surface concentrically with the axis 592. In addition, the output member 470 includes a snap ring groove 492 and a fluid passageway 490, with a portion of the fluid passageway 490 concentrically extending through the output member 470.

A clutch pack 494 selectively couples the input member 454 to the output member 470. The clutch pack 494 includes alternating friction disks 498 and reaction plates 502. In the illustrated embodiment, the clutch assembly 434 includes seven friction disks 498 and six reaction plates 502. The friction disks 498 include frictionally enhanced surfaces 508 to increase the coefficient of friction thereon and radially inwardly facing teeth 506. Conversely, the reaction plates 502 include radially outwardly facing teeth 510.

The clutch assembly 434 includes a housing 514 surrounding the clutch pack 494, a portion of the input member 454, and a portion of the output member 470. The housing 514 is generally defined as a hollow cylindrical member and is configured to translate along the axis 592 in a first direction 516 and a second direction 520. The housing 514 includes an end with an abutting surface 524. Vent apertures 518 axially and circumferentially spaced on the housing 514 provide communication between the exterior and the interior of the housing 514. The housing 514 includes internal teeth 522 located on an interior surface and opposing grooves 526 generally located adjacent the edges of the housing 514 and extending 360 degrees therein.

The clutch assembly 434 also includes a front end ring 530 and a rear end ring 534 on each side, respectively, of the clutch pack 494. The front end ring 530 generally surrounds the input member 454 and the output member 470, whereas the rear end ring 534 generally surrounds the output member 470. Each end ring 530, 534 is stepped and includes a portion having teeth 538 that radially face away from the axis 592. Each end ring 530, 534 is axially fixed relative to the housing 514 via snap rings 540 positionable within the grooves 526.

The clutch assembly 434 further includes biasing members 542 received within the cavity 486. In the illustrated embodiment, the biasing members 542 comprise four disc springs that bias the rear end ring 534 from the output member 470.

A ring member 546 adjacent the housing 514 and the rear end ring 534 includes a front surface 550 facing the abutting surface 524 of the housing 514 and a rear surface 554. A circumferential groove 556 is located between the front and the rear surfaces 550, 554. The ring member 546 has an inner diameter 558 that is greater than an outer diameter of the output member 470. A seal ring 570 is seated within the groove 556.

An outer diameter of the ring member 546 is sized to be received within an inner diameter of a cover 562. The cover 562 is coupled to the output member 470 via a snap ring 566 within the groove 492 to inhibit relative movement between the cover 562 and the output member 470 along the axis 592. In the illustrated embodiment, the cover 562 is fixed relative to the output member 470 for co-rotation therein. As a result, a clearance fit (e.g., frictional fit) may be constructed between the cover 562 and the output member 470. In other embodiments, angular acceleration observed by the output member 470 may be low enough such that the cover 562 may not need to be fixed to the output member 470, but rather a slight differential of angular velocity exists between the cover 562 and the output member 470.

During assembly of the clutch assembly 434, the bearings 466 rotatably couple the input member 454 to the output member 470 for relative rotation therebetween when torque is not fully transferred through the clutch assembly 434. As such, a portion of the output member 470 rotates within the hollow portion of the input member 454. The housing 514 is assembled over the output member 470 such that teeth 478, 522 are engageably coupled. The clutch pack 494 is assembled to couple the input member 454 to the housing 514 through engagement of the teeth 510 of the reaction plates 502 with the teeth 522 and through engagement of the teeth 506 of the friction disks 498 with the teeth 462.

Each of the end rings 530, 534 is positioned such that the teeth 538 mate with the teeth 522. The snap rings 540 abut each of the end rings 530, 534 and are located within the grooves 526 to prevent the front end ring 530 from moving in the first direction 516 and the rear end ring 534 from moving in the second direction 520 relative to the housing 514.

The biasing members 542 are positioned between and in direct contact with the output member 470 and the rear end ring 534. Upon assembly, the biasing members 542 bias the rear end ring 534 in the second direction 520 to force the front end ring 530 via the housing 514 against the clutch pack 494.

The ring member 546 is assembled between the cover 562 and the housing 514 such that the front surface 550 engages the abutting surface 524. The ring member 546 defines a fluid-tight seal with the cover 562. The cover 562 is positioned generally rearward (e.g., in the second direction 520) of the fluid passageway 490 on the output member 470 such that the fluid passageway 490 is in communication with a gap or chamber 574 (FIG. 12) formed between the cover 562 and the ring member 546.

In operation, fluid is introduced into the chamber 574 via the fluid outlet passageway 490 as the clutch assembly 434 rotates. In an engaged position as illustrated in FIG. 12, the biasing members 542 bias the housing 514 in the second direction 520 to sandwich the front end ring 530 against the clutch pack 494 and the output member 470. As such, torque from the motor 430 is transferred through the input member 454 via the input gear 458 to the output gear 474 of the output member 470. Torque is then transferred through the input gear 594 and the idler shaft 590 to the output gear 598 and to the input gear 602 of the wheel hub assembly 442 in order to rotate a wheel of the commodity cart 22.

With increasing rotation of the clutch assembly 434, the pressure of the fluid within the chamber 574 increases such that the force generated on the rear surface 554 of the ring member 546 begins to move the front end ring 530 in the first direction 516 to an intermediate position, similar to the intermediate position illustrated in FIG. 7, and the plates 498, 502 begin to slip. With a further increase in fluid pressure within the cavity 574 due to increased angular velocity of the clutch assembly 434, the pressure acting on the rear surface 554 of the ring member 546 moves the housing 514 in the first direction 516 via contact between the abutting surface 524 and the front surface 550. Consequently, the front end ring 530 moves in the first direction 516 such that the clutch pack 494 expands into a disengaged position, decoupling the input member 454 and the output member 470.

Accordingly, the clutch assemblies 34, 434 operate under similar principles. However, the clutch assembly 434 provides a greater gear reduction compared to the clutch assembly 34 resulting in a lower rotational velocity of the clutch assembly 434. For example, the clutch assembly 34 is in the disengaged position (FIG. 8) when the angular velocity of the clutch assembly 34 is greater than about 9,000 RPM compared to an angular velocity of about 6,000 RPM when the clutch assembly 434 is in the disengaged position. The reduced angular velocity provides less stress on the bearings 466, 482. However, torque transmitted through the clutch assembly 434 is greater than torque transmitted through the clutch assembly 34. As a result, additional friction disks 498 and reaction plates 502 are needed to handle the additional torque transferred through the clutch assembly 434. Alternatively, the number of friction disks 498 and reaction plates 502 may remain the same compared to the clutch assembly 34, but the diameter of the friction disks 498 and the reaction plates 502 may increase to handle the additional torque.

The drive systems 26, 426 including the clutch assembly 34, 234, 434 are not limited in application to the particular agricultural machinery previously described, but can be used in any equipment in which engagement and disengagement of power transfer under such conditions is desired.

Various features and advantages of the disclosure are set forth in the following claims.

What is claimed is:

1. A drive system comprising:
an electric motor;
a transmission member coupled to a wheel hub assembly; and
a hydraulically actuated clutch assembly including a housing configured to axially move relative to the electric motor between a first position and a second position, the clutch assembly operable to transfer torque in a downstream direction from the electric motor to the transmission member while the housing is in the first position, the clutch assembly also operable to disengage the electric motor from the transmission member in response to a rotational velocity of the wheel hub assembly above a predetermined amount causing the housing to move in an upstream direction into the second position.

2. The drive system of claim 1, wherein the clutch assembly comprises:
an input member configured for coupling to the electric motor;
an output member configured for coupling to the transmission member, the input member and the output member rotatable about an axis;
a clutch pack engaged with the input member for co-rotation about the axis;
a cover; and
a ring member positioned along the axis from the cover such that the cover and the ring member define a movable chamber therebetween configured to receive a hydraulic fluid, wherein the clutch pack is operable to decouple the input member from the output member in response to a pressure of the hydraulic fluid within the chamber;
wherein the housing is engaged with the output member and the clutch pack for co-rotation about the axis.

3. The drive system of claim 2, further including a biasing member positioned to bias the ring member along the axis toward the cover.

4. The drive system of claim 2, wherein the clutch pack is operable to decouple the input member from the output member in response to a pressure of the hydraulic fluid acting on the ring member.

5. The drive system of claim 2, wherein the chamber is positioned within the clutch assembly such that the pressure of the hydraulic fluid within the chamber increases in response to rotation of the output member about the axis.

6. The drive system of claim 2, wherein the output member and the input member includes external spur gears.

7. The drive system of claim 2, wherein the clutch pack includes a plurality of friction disks and a plurality of reaction plates, and wherein each of the friction disks is engaged with the input member and each of the reaction plates is engaged with the housing.

8. The drive system of claim 1, wherein the clutch assembly comprises a clutch pack including a plurality of friction disks and a plurality of reaction plates.

9. The drive system of claim 8, wherein the clutch assembly includes an input member coupled to the electric motor and an output member coupled to the transmission member, wherein the housing engages the output member and the clutch pack for co-rotation about an axis, the housing configured to translate along the axis in the upstream direction to disengage the plurality of friction disks from the plurality of reaction plates in response to the rotational velocity of the wheel hub assembly above the predetermined amount.

10. The drive system of claim 9, wherein the clutch assembly includes a biasing member configured to resist translation of the housing along the axis.

11. The drive system of claim 9, wherein the clutch assembly includes a ring member in axial contact with the housing and received within a cover, the ring member and cover defining a movable chamber therebetween.

12. The drive system of claim 11, wherein the output member includes a recess in fluid communication with the chamber.

13. The drive system of claim 11, wherein the chamber is configured to receive a hydraulic fluid, wherein the clutch assembly is operable to disengage the electric motor from the transmission member in response to a pressure of the hydraulic fluid within the chamber.

14. The drive system of claim 13, wherein the chamber is positioned within the clutch assembly such that the pressure of the hydraulic fluid within the chamber increases in response to the rotational velocity of the wheel hub assembly.

15. A drive system comprising:
an input member rotatable about an axis, the input member configured to be coupled to a motor;
an output member rotatable about the axis, the output member configured to be coupled to a wheel hub assembly;
a clutch pack operably positioned between the input member and the output member; and
a housing engageable with an outer perimeter of the clutch pack, the housing configured to move along the axis to enable decoupling of the motor from the wheel hub assembly in response to a rotational velocity of the wheel hub assembly above a predetermined amount.

16. The drive system of claim 15, wherein the housing engages the output member, and wherein the housing is configured to remain engaged with the output member when the motor is decoupled from the wheel hub assembly.

17. The drive system of claim 15, wherein the housing is a cylindrical member having a hollow interior, and wherein the clutch pack, a portion of the input member, and a portion of the output member are received within the hollow interior.

18. A drive system comprising:
an input member rotatable about an axis, the input member configured to be coupled to a motor;
an output member rotatable about the axis, the output member configured to be coupled to a wheel hub assembly;
a clutch pack operably positioned between the input member and the output member; and
a housing including a hollow interior sized to receive the clutch pack;
wherein an open cavity is in communication with the hollow interior of the housing, wherein the open cavity is configured to receive a fluid, and wherein the clutch pack is operable to decouple the motor from the wheel hub assembly in response to a rotational velocity of the wheel hub assembly above a predetermined amount causing a pressure of the fluid within the open cavity to increase.

19. The drive system of claim 18, wherein the output member includes an aperture configured to supply the open cavity with the fluid.

20. The drive system of claim 18, wherein the open cavity is defined by a cover and a moveable member, wherein the cover is fixed relative to the output member in a direction along the axis, wherein the moveable member includes an opening that provides communication between the open cavity and the hollow interior of the housing, and wherein the moveable member is configured to move the housing in the direction along the axis in response to the pressure of the fluid increasing within the open cavity to enable decoupling of the motor and the wheel hub assembly.

* * * * *